(12) United States Patent
Russell

(10) Patent No.: US 6,373,726 B1
(45) Date of Patent: Apr. 16, 2002

(54) FLYBACK CONVERTER WITH TRANSISTORIZED RECTIFIER CONTROLLED BY PRIMARY SIDE CONTROL LOGIC

(75) Inventor: Antoin Russell, Castleconnell (IE)

(73) Assignee: Power-One A.G., Uster (CH)

( * ) Notice: Subject to any disclaimer, the term of this patent is extended or adjusted under 35 U.S.C. 154(b) by 0 days.

(21) Appl. No.: 09/494,098

(22) Filed: Jan. 28, 2000

(30) Foreign Application Priority Data

Jan. 28, 1999 (DE) .................................... 299 01 322 U

(51) Int. Cl.[7] ............................................. H02M 3/335
(52) U.S. Cl. ....................... 363/21.14; 363/97; 363/127
(58) Field of Search ............................. 363/20, 21, 97, 363/127, 21.14

(56) References Cited

U.S. PATENT DOCUMENTS

| | | | | |
|---|---|---|---|---|
| 5,099,406 A | * | 3/1992 | Harada et al. ................. 363/20 |
| 5,103,387 A | * | 4/1992 | Rosenbaum et al. .......... 363/21 |
| 5,303,138 A | * | 4/1994 | Rozman ....................... 363/97 |
| 5,331,533 A | * | 7/1994 | Smith .......................... 363/97 |
| 5,424,932 A | * | 6/1995 | Inou et al. .................... 363/127 |
| 5,742,491 A | * | 4/1998 | Bowman et al. ............. 363/127 |
| 5,764,495 A | * | 6/1998 | Faulk ........................... 363/21 |
| 5,784,266 A | * | 7/1998 | Chen ............................ 363/20 |
| 5,946,207 A | * | 8/1999 | Schoofs ........................ 363/127 |
| 5,956,241 A | * | 9/1999 | LoCascio ...................... 363/21 |
| 5,991,171 A | * | 11/1999 | Cheng .......................... 363/21 |
| 5,991,172 A | * | 11/1999 | Jovanovic et al. ............. 363/21 |
| 6,002,597 A | * | 12/1999 | Rozman ........................ 363/21 |
| 6,069,804 A | * | 5/2000 | Ingman et al. ................ 363/21 |

* cited by examiner

Primary Examiner—Jeffrey Sterrett
(74) Attorney, Agent, or Firm—Castor & Schnedler, P.A.

(57) ABSTRACT

The invention concerns a voltage converter of the flyback converter type, having a switching element on the primary side in relation to an inductor and an output capacitor on the secondary side which can be charged as a reaction to a current which flows in the inductor and which is switched by the switching element, said output capacitor being associated with a blocking element on the secondary side, wherein the blocking element is in the form of a further switching element which can be put into a blocking condition by a control signal, and there are provided control means for production on the primary side of the control signal, which are such that the control signal is produced a predetermined time interval before a conducting condition of the switching element on the primary side.

20 Claims, 4 Drawing Sheets

FLYBACK CONVERTER WITH TRANSISTORIZED RECTIFIER CONTROLLED BY PRIMARY SIDE CONTROL LOGIC

BACKGROUND OF THE INVENTION

The present invention concerns a voltage converter as set forth in the classifying portion of claim 1.

Such voltage converters, of the blocking or reverse converter type, also known as so-called "flyback" converters, belong to a switching power supply topology which, besides a central inductor, preferably with two potential-separated windings, has a switch on the primary side, which is switched for controlledly connecting the inductor to an input voltage source, and on the secondary side, an output capacitor connected to the inductor by way of a diode.

A circuit topology of that kind, which is generally known as such and which is disclosed for example in Schott, "Power-Factor-Controller . . . ", Components 31 (1993), issue 2, pages 46 ff, has, as a converter principle, numerous advantages which make the circuit arrangement highly suitable for the implementation of switching power supplies: thus, when that principle is adopted, it is possible in particular to control and limit the switch-on current, and the output voltage can be greater or smaller than the instantaneous input voltage so that any output voltages can be generated from the input voltage. A further advantage of that topology is in addition the galvanic separation of the primary and the secondary sides if a transformer is used as the inductor.

Nonetheless such a voltage converter circuit of the general kind set forth, of the flyback converter type, also suffers from disadvantages inherent therein by virtue of the principle involved, thus for example the heavy loading of the output diode due to high currents, with a correspondingly disadvantageous consequence for the level of efficiency of the circuit (due to the fixed reverse voltage of the diode) and a relatively severe dependency of the output voltage on the output current.

OBJECTS OF THE INVENTION

There is therefore a need to improve the effectiveness or efficiency of such a converter circuit of the general kind set forth, so that the object of the present invention is to provide a voltage converter of the general kind set forth, of the flyback converter type, which is improved in terms of its efficiency, in particular in regard to minimizing secondary-side losses, and the dependency of the output voltage on the load current.

SUMMARY OF THE INVENTION

In an advantageous manner in accordance with the invention, the blocking element on the secondary side is in the form of a switching element, in particular a transistor, which, due to the control signal according to the invention—like the blocking characteristic of the diode of the general kind set forth—alternately blocks and conducts in dependence on the conduction condition on the primary side so that, to produce the flyback converter effect, at no point is there an unwanted common switch-on condition between input and output terminals on the primary and secondary sides, which would result in uncontrolled and unwanted over-currents.

In this respect, in accordance with the present invention, a particular difficulty involves compensating for the delays which are caused by parasitic capacitances or the like upon actuation of the switching element, by nonetheless achieving a clear and tidy switching characteristic. In accordance with the invention that is achieved in that the control means according to the invention cause the control signal for producing the blocking condition to lead the primary-side clock by a short time interval, in which respect it has proven to be particularly suitable for triggering for that leading control signal also to be effected on the primary side, more specifically in particular by means of the actuation unit which also provides for pulse width-modulated actuation of the primary-side switching element.

Advantageous developments of the invention are set forth in the appendant claims.

Thus, in the practical circuitry implementation, both the primary-side switching element and also the (secondary-side) further switching element is implemented in the form of an FET-transistor with purely ohmic path or channel resistance in the conducting condition, in which respect here suitable, commercially available, integrated circuit components provide for the pulse width-modulated, preferably load-regulated actuation of the primary-side field effect transistor.

In this respect, in accordance with the invention, preferably a further signal output of the integrated component, which is of a ramp configuration in the primary-side clock phase, is used in order for example by means of a Schmitt trigger function to obtain the leading control signal for the secondary-side further switching element.

In that respect, in accordance with a further preferred development, it can in particular also be advantageous for that control signal to be transmitted by means of a suitable transformer, optocoupler or the like in galvanically isolated relationship from the primary side to the secondary side.

BRIEF DESCRIPTION OF THE DRAWING

Further advantages, features and details of the invention will be apparent from the description hereinafter of preferred embodiments and with reference to the drawings in which.

DESCRIPTION OF THE PREFERRED EMBODIMENTS

Figure 1:
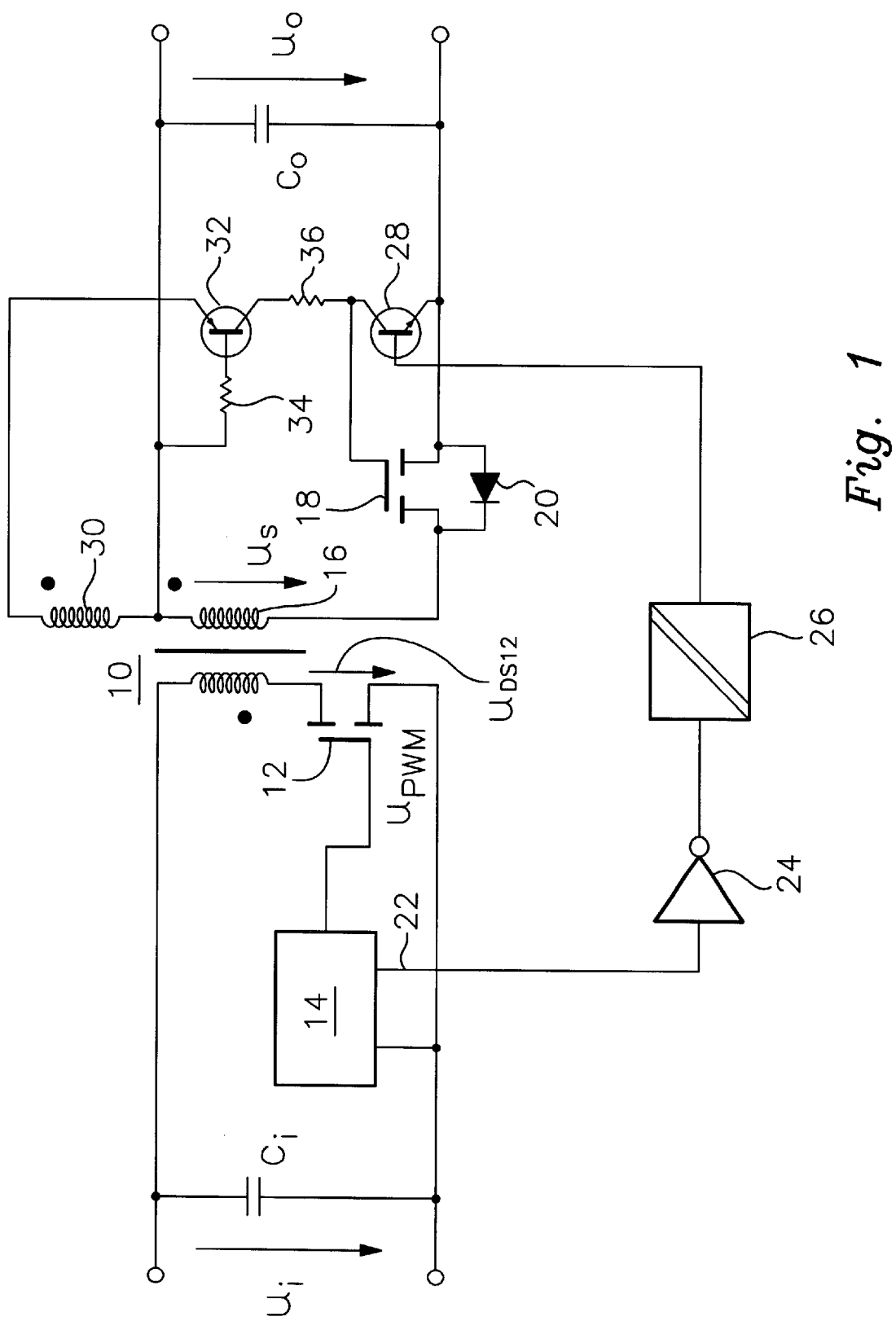
FIG. 1 shows a schematic circuit diagram of the voltage converter in accordance with a first preferred embodiment.

Referring to FIG. 1, shown therein is the voltage converter of the blocking or flyback converter type in accordance with a first embodiment of the present invention, wherein an input voltage $U_i$ across a capacitor $C_i$ at the input side as a dc voltage is converted into an output voltage $U_o$ across a capacitor $C_o$ on the output side.

As also in the case of the flyback converter of the general kind to which the invention relates, the primary circuit, besides the primary winding of the transformer 10, has an electronic switch 12 which is in the form of a field effect transistor and which is supplied with a pulse-width modulated control signal by a control logic component 14 in otherwise known manner.

On the secondary side, the main circuit between the secondary winding 16 of the transformer 10 and the output capacitor $C_o$ is closed by an electronic switch 18 which is also in the form of a field effect transistor, while an optionally provided diode 20 is connected in parallel in the channel direction with the switch 18.

The control signal for the FET 18 for opening or closing same is produced by way of the network which is to be described hereinafter:

A signal output 22 which in a manner to be described below produces a signal leading the switching control of the FET 12 is applied by way of an amplifier unit 24 as a pulse shaper and a potential separation unit 26 to the base of a transistor 28 which on being caused to conduct draws the gate of the FET 18 to ground and thus closes the channel of the FET 18.

To make that switch conducting, a signal which is tapped out of an auxiliary winding 30 on the secondary side is applied by the action of a transistor 32 whose base is connected by way of a base resistor 34 to the main winding 16 on the secondary side, to the gate of the FET 18 by way of a resistor 36, and opens that FET 18 as soon as a positive voltage signal is induced in the auxiliary winding 30, when the transistor 32 is conducting.

The winding direction of the primary winding and the secondary winding 16, and the auxiliary winding 30 respectively of the transformer 10 is in opposite relationship, in the manner which is typical of a flyback converter.

In accordance with alternative embodiments, it would also be possible for the circuitry principle to be implemented without the auxiliary winding and/or the transistor 32 and for the resistor 36 to be applied directly to the secondary winding 16.

The mode of operation of this circuit is described hereinafter with reference to the signal pattern views shown in FIG. 2.

Figure 2:
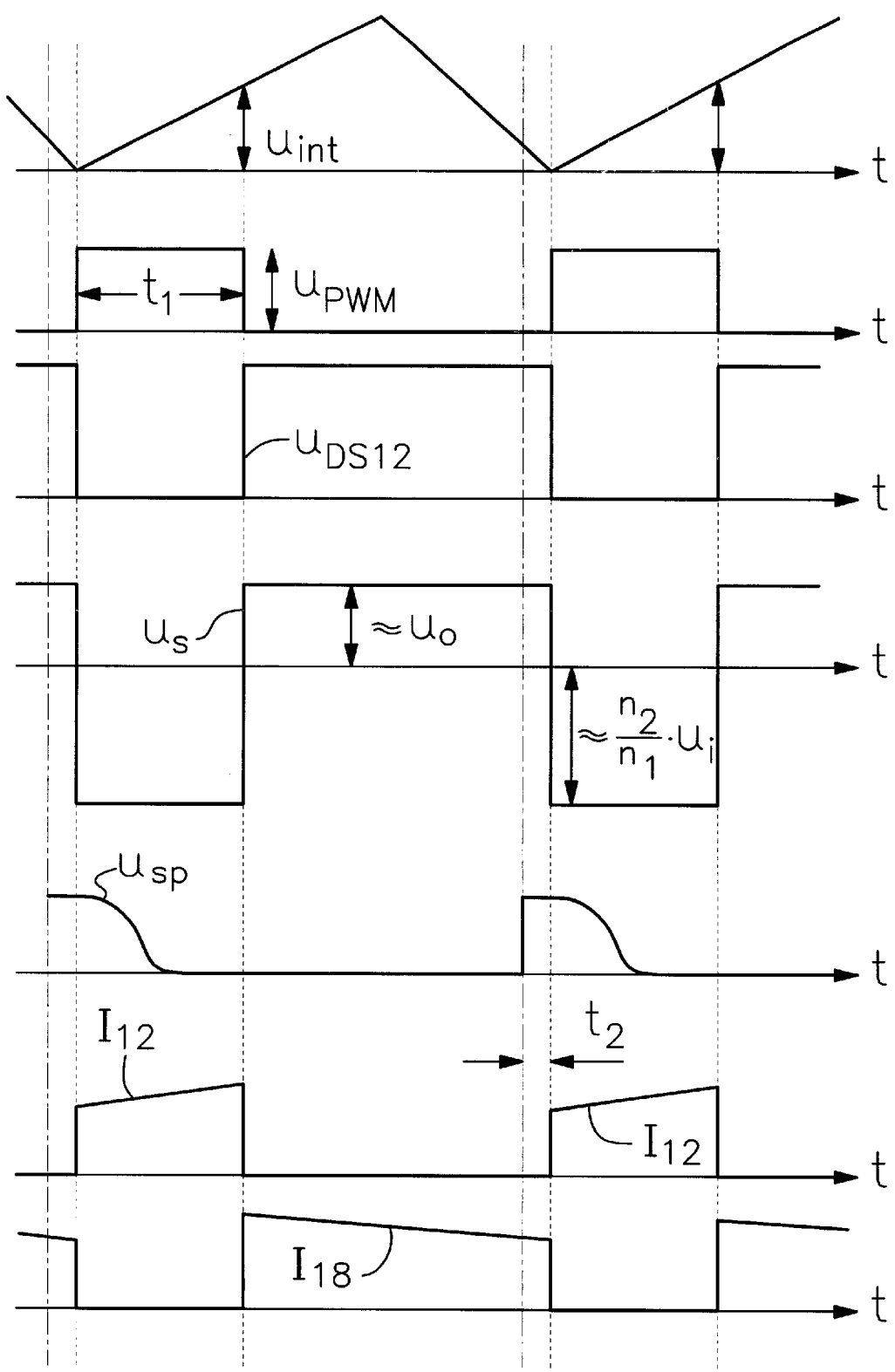
FIG. 2 shows a signal pulse diagram of various voltage configurations of the circuit of FIG. 1, in relation to time.

The uppermost curve configuration shows an internal voltage level $U_{int}$ of the control logic component 14, which rises and falls respectively in a ramp configuration and which at the base of the FET 12 produces a rectangular voltage signal $U_{PWM}$ (second curve configuration in FIG. 2). In the illustrated embodiment the switch-on period of $U_{PWM}$ involves a switch-on duration of $t_1$ and influences the output voltage $U_o$.

The channel voltage $U_{DS12}$ across the channel of the FET 12 (third curve in FIG. 2) is accordingly ideally 0 during the switch-on phase of $U_{PWM}$ while, corresponding to the signal configuration on the primary side, the voltage during the switch-off period of the FET 12 ($U_{PWM}=0$) is of an approximately constant nature.

The secondary voltage $U_s$ across the secondary winding 16 exhibits the configuration illustrated in the fourth curve in FIG. 2, in the period of time under discussion: during the on phase of the FET 12 (the FET 18 is not conducting), the input voltage $U_i$ which is transmitted in the turns ratio $n_2$ (secondary winding)/$n_1$ (primary winding) is applied here and during the non-conducting phase of the FET 12 (that is to say the FET 18 is open) the secondary voltage $U_s$ is equal to the output voltage $U_o$.

The fifth signal configuration in FIG. 2 shows that, to achieve that—idealized—switching characteristic on the part of the FET 18, a blocking signal must be produced from $U_{sp}$, which must lead the rise time $U_{PWM}$ by a short time interval $t_2$: $U_{sp}$ therefore rises in advanced relationship by the time interval $t_2$ (which is short in relation to $t_1$), before $U_{PWM}$ rises. As moreover, as can be seen from the uppermost signal curve in FIG. 2, the rise time for $U_{sp}$ is triggered by the falling edge of the internal ramp voltage $U_{int}$ in the integrated component 14, $U_{sp}$ falls again with a rising edge $U_{int}$ to 0 until at the end of the next switch-off period of the PWM-control signal for the FET 12 ($U_{PWM}$) the leading control signal $U_{sp}$ can be produced again.

The bottom two curves in FIG. 2 additionally show the current configurations on the primary and secondary sides, at medium and high load currents.

It is thus advantageously possible, in the illustrated fashion, to combine the positive properties of the flyback converter topology with efficiency-enhancing measures of the connected blocking elements as are known for example from synchronous rectifiers, thereby to arrive at a circuit which is optimized in efficiency terms. In addition the illustrated circuit achieves further advantages, namely a permanent current on the secondary side, even with a very low load current. Due to that current flow, the load cycle or duty cycle remains almost influenced by the load current, and an unwanted rise in the output voltage $U_o$ if the load current is low or if there is no load current is avoided. As a result, there is also no need for an ohmic series or initial load which is otherwise necessary for ensuring a minimum current flow, with the losses that this entails and adverse effects on efficiency.

Figure 4:
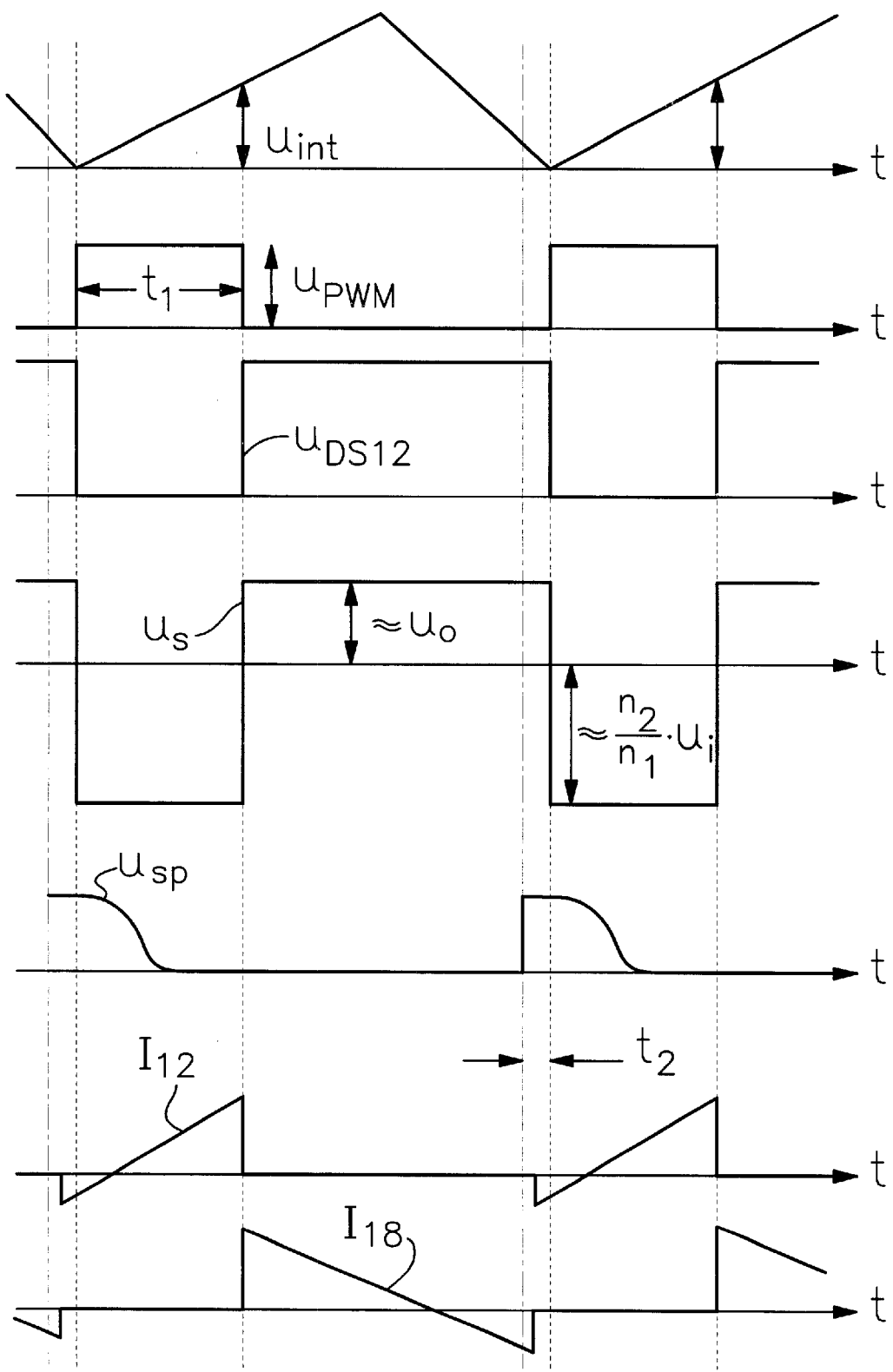
FIG. 4 shows a signal pulse diagram similar to FIG. 2 with primary-side and secondary-side current configurations with a low load.

These current configurations with a low load current are shown in comparison with FIG. 2 at the bottom in FIG. 4 (bottom two curves); intermittent operation is avoided by virtue of the permanent current flow—on the primary side or the secondary side—through the inductor.

Figure 3:
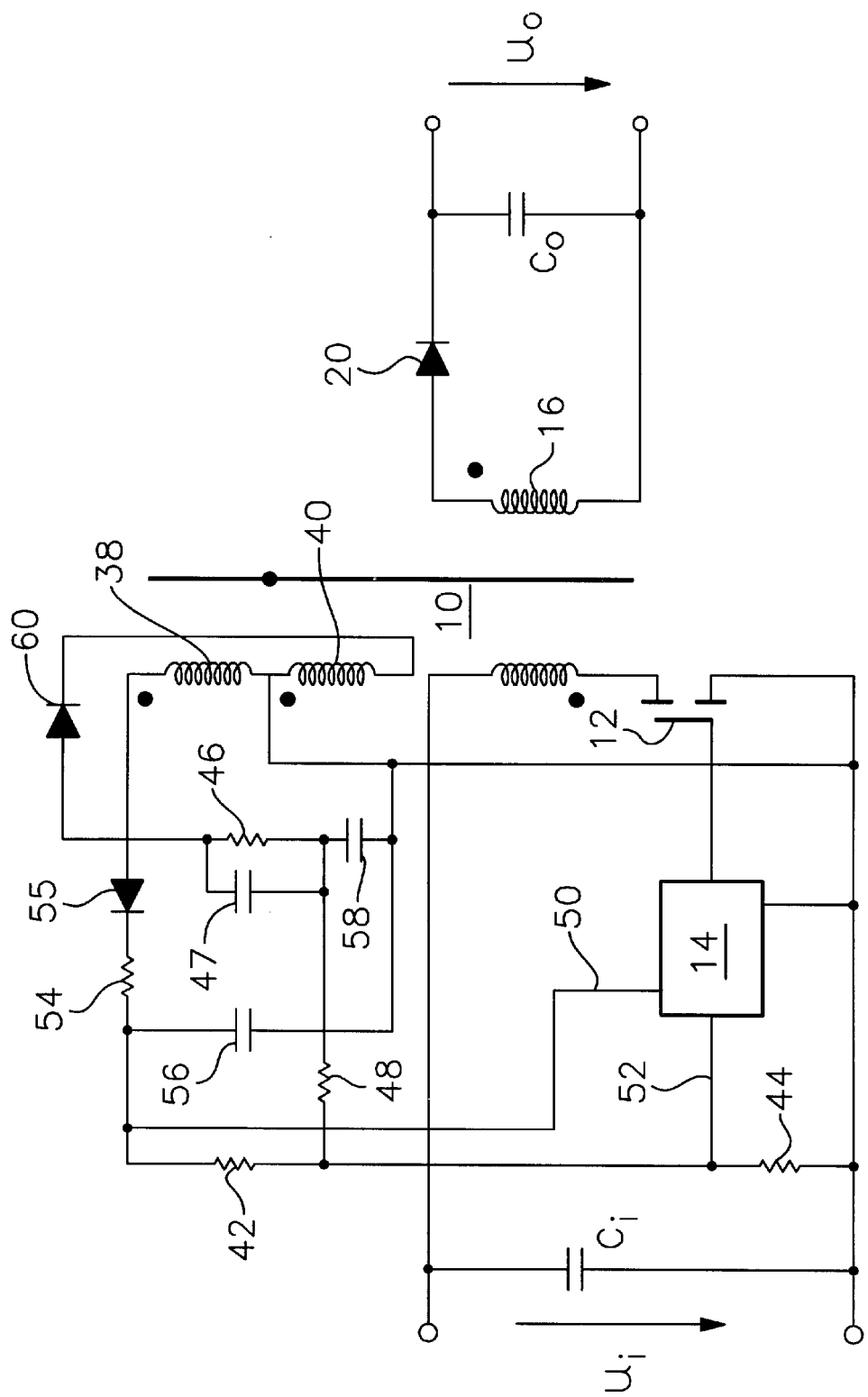
FIG. 3 shows a schematic circuit diagram of the voltage converter according to the invention in accordance with a second embodiment, for which protection is claimed independently of the first embodiment.

Reference will now be made to FIG. 3 to describe a development of the present invention, which in addition also independently has advantageous properties in regard to regulation of the output voltage in the event of load current changes on the output side. The circuit elements corresponding to FIG. 1 are denoted by the same reference numerals and in that respect are identical in terms of their functions; it is also possible for the diode 20 in FIG. 3 to be replaced or supplemented by an FET 18 with is connected as shown in FIG. 1 or in the above-described manner.

The circuit of FIG. 3 additionally has two opposite-phase, primary-side auxiliary windings 38, 40 which act by way of a voltage divider arrangement consisting of the networks 55, 54, 42, 44 and 46, 47, 48, 44 respectively on an internal signal input 52 of the electronic control logic 14 and thus provide for load regulation (in accordance with the output voltage which is transmitted back to the auxiliary windings 38, 40 on the primary side) by adaptation of the PWM-control signal for the main switch 12 on the primary side. That overshoot voltage across the winding 40 at the beginning depends on $I_o$ and its influence is detected by a peak value detector (constructed from a capacitor 58, the resistor 48 and a diode 60) and fed as a countervoltage or correction voltage by way of the resistor 48 to the voltage divider of the control logic 14. That markedly improves control and stabilization of changes in load (load regulation).

The present invention is not limited to the illustrated embodiments given by way of example; thus it is possible in particular to supplement the illustrated circuit diagrams shown as a matter of principle by additional networks or to use alternative switching elements, networks or electronic components for embodying the switching and circuitry functions according to the invention.

What is claimed is:
1. A voltage converter of the flyback converter type, having a switching element (12) on the primary side in relation to an inductor (10) and an output capacitor ($C_o$) on the secondary side which can be charged as a reaction to a current which flows in the inductor and which is switched by the switching element, said output capacitor being associated with a blocking element (18) on the secondary side, characterized in that the blocking element is in the form of a switching element (18) which can be put into a blocking condition by a control signal ($U_{sp}$), and there is provided control logic circuitry (14, 24, 26, 28) located only on said primary side for generating said control signal; said control logic circuitry being such that the control signal is produced a predetermined time interval ($t_2$) before a conducting condition of the switching element (12) on the primary side.

2. A voltage converter according to claim 1 characterized in that the control logic circuitry for producing the control signal are formed on the basis of an actuation unit (14) which is associated with the switching element on the primary side and which produces a switching control signal ($U_{PWM}$) for same.

3. A voltage converter according to claim 2 characterized in that the actuation unit is adapted to produce a periodically variable, in particular triangular or ramp-shaped level ($U_{int}$) which can be evaluated by the control logic circuitry for producing the control signal ($U_{sp}$) which leads the switching control signal, for the further switching element.

4. A voltage converter according to claim 3 characterized in that the control logic circuitry are adapted to produce the control signal for putting the further switching element into a conducting condition and the control signal is produced by means of a secondary-side auxiliary winding (30) of the inductor which is in the form of a transformer (10).

5. A voltage converter according to claim 3 characterized in that the actuation unit is in the form of an integrated circuit component (14), on the output side of which is connected as the control logic circuitry a pulse shaper network (24) and/or a switching network (28) for a semiconductor switch acting as the further switching element, in particular a field effect transistor (18).

6. A voltage converter according to claim 3 characterized by an additional diode (20) connected in parallel with a channel of the further switching element which is in the form of a semiconductor switch (18).

7. A voltage converter according to claim 3 characterized in that the control logic circuitry have means (26) for galvanic separation between the primary and secondary sides.

8. A voltage converter according to claim 2 characterized in that the actuation unit is in the form of an integrated circuit component (14), on the output side of which is connected as the control logic circuitry a pulse shaper network (24) and/or a switching network (28) for a semiconductor switch acting as the further switching element, in particular a field effect transistor (18).

9. A voltage converter according to claim 8 characterized by an additional diode (20) connected in parallel with a channel of the further switching element which is in the form of a semiconductor switch (18).

10. A voltage converter according to claim 8 characterized in that the control logic circuitry have means (26) for galvanic separation between the primary and secondary sides.

11. A voltage converter according to claim 8 characterized in that the control logic circuitry are adapted to produce the control signal for putting the further switching element into a conducting condition and the control signal is produced by means of a secondary-side auxiliary winding (30) of the inductor which is in the form of a transformer (10).

12. A voltage converter according to claim 2 characterized by an additional diode (20) connected in parallel with a channel of the further switching element which is in the form of a semiconductor switch (18).

13. A voltage converter according to claim 2 characterized in that the control logic circuitry have means (26) for galvanic separation between the primary and secondary sides.

14. A voltage converter according to claim 2 characterized in that the control logic circuitry are adapted to produce the control signal for putting the further switching element into a conducting condition and the control signal is produced by means of a secondary-side auxiliary winding (30) of the inductor which is in the form of a transformer (10).

15. A voltage converter according to claim 1 characterized in that the control logic circuitry are adapted to produce the control signal for putting the further switching element into a conducting condition and the control signal is produced by means of a secondary-side auxiliary winding (30) of the inductor which is in the form of a transformer (10).

16. A voltage converter according to claim 1 characterized by an additional diode (20) connected in parallel with a channel of the further switching element which is in the form of a semiconductor switch (18).

17. A voltage converter according to claim 16 characterized in that the control logic circuitry have means (26) for galvanic separation between the primary and secondary sides.

18. A voltage converter according to claim 16 characterized in that the control logic circuitry are adapted to produce the control signal for putting the further switching element into a conducting condition and the control signal is produced by means of a secondary-side auxiliary winding (30) of the inductor which is in the form of a transformer (10).

19. A voltage converter according to claim 1 characterized in that the control logic circuitry have means (26) for galvanic separation between the primary and secondary sides.

20. A voltage converter according to claim 19 characterized in that the control logic circuitry are adapted to produce the control signal for putting the further switching element into a conducting condition and the control signal is produced by means of a secondary-side auxiliary winding (30) of the inductor which is in the form of a transformer (10).

* * * * *